Patented Feb. 13, 1940

2,189,832

UNITED STATES PATENT OFFICE 2,189,832

PAPER MANUFACTURE

Harold R. Rafton, Andover, Mass., assignor to Raffold Process Corporation, a corporation of Massachusetts No Drawing. Application October 15, 1936, Serial No. 105,797

5 Claims. (Cl. 92—21)

My invention relates to the manufacture of alkaline earth metal compounds, the products resulting from such manufacture, the manufacture of paper with such products, and the paper so made. It also relates to the method of manufacture of other articles with such products, and the articles so made.

A principal object of my invention is the use of an acid reacting gas to supply an acidic radicle for subsequent combination in an alkaline earth metal compound.

Another principal object of my invention is the manufacture of paper filled with said so produced alkaline earth metal compound and the filled paper so made.

Another principal object of my invention is the manufacture of paper coated with said so produced alkaline earth metal compound and the coated paper so made.

Another principal object is the manufacture of rubber with said so produced alkaline earth metal compound and the rubber so made.

Another principal object is the manufacture of other articles such as paints, lacquers, plastics, putties and the like with said so produced alkaline earth metal compound and the articles so made.

A further object is the use of acid reacting gas such as carbon dioxide, sulphur dioxide or hydrogen fluoride, to supply an acid radicle for subsequent combination in an alkaline earth metal compound, and the use of alkali metal compound such as a sodium, potassium or lithium compound, particularly an alkaline compound of these metals such as the hydroxide, carbonate, bicarbonate, and the like, therewith.

More particularly the object of my invention is the use of carbon dioxide and sulphur dioxide, and more particularly carbon dioxide, especially with sodium carbonate or bicarbonate, employing slaked lime, or slaked lime containing magnesia, as the raw material to furnish alkaline earth metal radicle for the alkaline earth metal compound produced.

Further objects of my invention are the manufacture of alkaline earth metal carbonates by this method, the carbonates so manufactured, the manufacture of paper, both filled and/or coated, with said carbonates, and the paper so made.

Further objects are the manufacture of alkaline earth metal sulphites—particularly calcium sulphite, the sulphites so manufactured, the manufacture of paper, both filled and/or coated, with said sulphites, and paper so made.

Another object of my invention is the manufacture of calcium carbonate by this method, the calcium carbonate so manufactured, the manufacture of paper, both filled and/or coated, with said carbonate, and the paper so made.

Another object is the manufacture of calcium carbonate magnesium hydroxide by this method, the calcium carbonate magnesium hydroxide so manufactured, the manufacture of paper, both filled and/or coated, therewith, and the paper so made.

A further object is the manufacture of calcium carbonate magnesium basic carbonate by this method, the calcium carbonate magnesium basic carbonate so manufactured, the manufacture of paper, both filled and/or coated, therewith, and the paper so made.

Other objects and advantages of this invention will become apparent during the course of the following description.

My copending application Serial No. 589,523 filed January 28, 1932, of which the present application is a continuation in part, states that alkaline earth metal compounds, such as carbonate, for example calcium carbonate, or carbonate and accompanying material such as magnesium hydroxide, for example calcium carbonate magnesium hydroxide, have proven useful as pigments in the arts, particularly in the paper industry, to produce filled and coated paper.

That application further states that the causticizing operation in which alkaline earth metal carbonate is produced is frequently carried out in pulp mills connected with paper mills, the alkali metal hydroxide concomitantly produced with the alkaline earth metal carbonate being employed for the manufacture of pulp from cellulosic material. As the pulp production in a mill is usually fixed, there is thus a fixed amount of alkali metal hydroxide required and with the production of this hydroxide a fixed amount of alkaline earth metal carbonate is concomitantly produced which may as stated be used as a pigment. It sometimes occurs that more pigment is required in paper manufacture than is produced as a co-product of the alkali metal hydroxide required to be produced and in such cases the extra amount required has been procured at considerable expense by obtaining pigment from another source.

That application discloses that by employing bicarbonate of an alkali metal instead of or in conjunction with the alkali metal carbonate in the causticizing process, more pigment is obtained in proportion to the alkali metal hydroxide produced. The pigment and solution of alkali metal hydroxide produced are separated in any suitable manner such as by filtration, and each is further processed if desired in any manner customary in the art.

As stated in my copending application, the preferred method of carrying out this process is to react an alkaline earth metal base in the presence of a liquid, preferably water, with an alkali metal bicarbonate, said bicarbonate to be formed either prior to its introduction into the reaction or during the reaction. In the latter modification, this may be accomplished by leading carbon dioxide into a reaction mix of alkaline earth metal base and alkali metal carbonate, and the action of the thus introduced carbon dioxide—whatever be the theoretical intermediate compound produced, whether bicarbonate or carbonate—results in producing more alkaline earth metal carbonate in the reaction for a given amount of sodium hydroxide produced than would be obtained if sodium carbonate were employed.

As stated in said application, where I speak of an alkaline earth metal base, I mean a compound of an alkaline earth metal, that is, calcium, strontium or barium, such as the oxide, hydroxide or the like. Where the alkaline earth metal base used is an oxide, it may if desired, and this is my preferred procedure, be thoroughly slaked first to a thick aqueous mud or slurry.

As stated in said application, sodium bicarbonate may be used directly in the causticizing reaction, in place of or in conjunction with the customary sodium carbonate. However, in most cases where sodium bicarbonate is not directly available, I prefer to produce sodium bicarbonate by contact of carbon dioxide with the sodium compound, preferably in solution, such as sodium carbonate, although sodium hydroxide, sodium sulphite or other sodium compound, preferably under alkaline condition, may be employed either alone or in admixture. Carbon dioxide may be procured from any suitable source such as from a lime kiln, or from the burning of coke or other carbonaceous fuel such as coal, oil, gas or the like. Inasmuch, however, as ordinary flue gas produced as in a steam generating plant is readily available in practically every manufacturing establishment at little or no expense, I prefer to use ordinary flue gas for my purpose. The flue gas is preferably purified before use suitably by passing through a medium such as coke, preferably moistened, to remove principally mechanical impurities. If it would be desired additionally to remove chemical impurities such as sulphur dioxide, this may be accomplished by passing the gas through a medium such as limestone preferably moistened with water.

As stated in said application, while the sodium bicarbonate may be produced in any known way, for example, by contacting sodium carbonate in solution with carbon dioxide and recovering the solid sodium bicarbonate for use, however, I prefer to employ a solution of sodium bicarbonate made by contacting sodium carbonate solution with carbon dioxide. That is to say, I convert the sodium carbonate to sodium bicarbonate either partially or wholly, and then utilize this solution instead of ordinary sodium carbonate to react with an alkaline earth metal base. Instead of treating the sodium carbonate prior to use with carbon dioxide or in addition to so treating it, I may as referred to above lead carbon dioxide directly into the reaction mix of the lime and sodium compound. If desired to obtain sodium hydroxide concomitantly with the alkaline earth metal carbonate produced, the carbon dioxide used is regulated so that not sufficient will be used to carbonate the quantity of sodium hydroxide desired to be produced. The pigment is produced in an amount larger than would be produced with sodium carbonate, and of course proportionately more lime than in such case must be employed in the reaction. The amounts of carbon dioxide and lime, or lime containing magnesia, as well as the sodium compound, required to be used in any given case to produce any desired amounts of pigment and sodium hydroxide can be directly computed by stoichiometrical calculation.

As stated in said application, if the causticizing reaction be conducted as is sometimes the practice in more than one stage and/or more than one portion of sodium carbonate and/or lime be employed, it will of course be apparent that either one or more of the several portions of sodium carbonate added may be partially or wholly bicarbonated as by the addition of carbon dioxide, or the carbon dioxide may be introduced at one or more stages of the reaction. Furthermore of course, the sodium hydroxide produced in the reaction may be subjected in part or in whole to reaction with carbon dioxide for use cyclically in the process. If such carbonated liquid be reused in the process, it may be concentrated by evaporation if desired.

As stated in said application, if lime containing magnesia is used in the process, it is possible, by having carbon dioxide led into the reaction mix in an amount sufficient theoretically to convert part of the sodium content into the bicarbonate at least temporarily, to produce as a final reaction product calcium carbonate magnesium basic carbonate. In such case substantially no sodium hydroxide will finally be produced, the sodium compound present serving no doubt merely as a carrier to introduce the carbonate radicle in the reaction, resulting in calcium carbonate magnesium basic carbonate being formed instead of calcium carbonate magnesium hydroxide. Likewise if it is desired to produce no sodium hydroxide, the reaction employing lime, or lime containing magnesia, and a sodium compound may still be employed, by using sodium bicarbonate, or a sodium compound such as sodium carbonate with carbon dioxide, in quantity sufficient so that no sodium hydroxide is finally produced, in which case the final liquor contains sodium carbonate, or sodium bicarbonate with or without free carbon dioxide in solution or suspension, in accordance with the amounts of sodium bicarbonate or sodium carbonate and carbon dioxide employed. Calcium carbonate, calcium carbonate magnesium hydroxide or calcium carbonate magnesium basic carbonate may be thus made and the following reactions are examples of the practice of this modification of the process which are shown in my said copending application.

Using slaked calcium lime:

$$2Ca(OH)_2 + Na_2CO_3 + 2CO_2 = 2CaCO_3 + Na_2CO_3 + 2H_2O$$

or

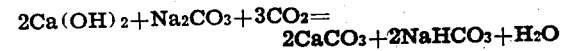
$$2Ca(OH)_2 + Na_2CO_3 + 3CO_2 = 2CaCO_3 + 2NaHCO_3 + H_2O$$

Using slaked lime containing magnesia:

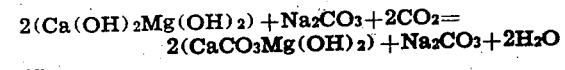
$$2(Ca(OH)_2Mg(OH)_2) + Na_2CO_3 + 2CO_2 = 2(CaCO_3Mg(OH)_2) + Na_2CO_3 + 2H_2O$$

or

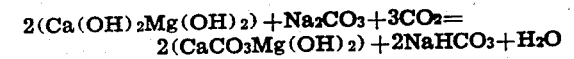
$$2(Ca(OH)_2Mg(OH)_2) + Na_2CO_3 + 3CO_2 = 2(CaCO_3Mg(OH)_2) + 2NaHCO_3 + H_2O$$

This last reaction is probably only intermediate as the calcium carbonate magnesium hydroxide reacts with the sodium bicarbonate to form calcium carbonate magnesium basic carbonate. Owing to the uncertainty of the exact formula of the calcium carbonate magnesium basic carbonate, the reaction producing this pigment may, without the use of chemical symbols, be written with reasonable accuracy as follows:

Calcium carbonate magnesium hydroxide+sodium carbonate=calcium carbonate magnesium basic carbonate+sodium carbonate or Calcium carbonate magnesium hydroxide+sodium carbonate+carbon dioxide=calcium carbonate magnesium basic carbonate+sodium carbonate or bicarbonate.

I state in said copending application that any apparatus suitable for use with gas absorption reactions may be used, such as a tower or tank, preferably equipped with means to provide suitable agitation. I prefer to use a vertical cylindrical tank fitted with a turbo-mixer or mixers, preferably introducing the gas into the liquid at the center and below the turbo-mixer. As will be apparent the reaction may be carried out either as a batch or continuous process, and the countercurrent principle may be employed if desired. As will be also apparent the gas may be led in at any time during the reaction, either intermittently or continuously as desired. As is well known, the causticizing reaction with the usual apparatus employed takes an appreciable length of time to carry out. The time requirements for my reaction may vary from approximately the same time to a somewhat longer time, depending on the amount of carbon dioxide desired to be introduced. In that adaptation wherein calcium carbonate magnesium basic carbonate is produced the time required may be distinctly longer. My reaction may be carried out under any conditions as regards pressure, either subatmospheric, atmospheric, or superatmospheric being feasible, but for sake of simplicity in the apparatus required, I prefer the use of ordinary or atmospheric pressure. Likewise any temperature may be employed from cold to boiling, but I prefer to use a temperature fairly low at first, but coming at or nearly to boiling near the completion of the reaction. Where calcium carbonate magnesium basic carbonate is to be produced, the crystalline form of the material may be controlled by controlling the temperature during the reaction.

I further state in my copending application that while I have described the use of carbon dioxide, I may use other acid reacting gases, for example sulphur dioxide, hydrofluoric acid, and the like either alone or together with carbon dioxide, either with the alkali metal carbonate and/or with other alkali metal compound or compounds, such as for example the one corresponding to the acid gas used, e. g. sodium sulphite, or fluoride. In such case the kind and amount of gas used will of course be chosen and regulated according to the insolubility of the compound or compounds produced, and the composition of the pigment produced will be thus modified according to the corresponding compound or compounds formed, all as will be apparent to and readily calculable by the skilled chemist. The acid gas may be used directly as such, or in combination with water if desired, and this latter practice I consider the equivalent of introducing the gas directly.

To summarize: my above mentioned copending application discloses among other things the production of calcium carbonate, calcium carbonate magnesium hydroxide, calcium carbonate magnesium basic carbonate, or other alkaline earth metal compounds, by sodium bicarbonate or by a reaction involving the use of a gas such as carbon dioxide in the presence of an alkali metal compound such as sodium carbonate, for use particularly in the manufacture of paper or as a pigment in other arts.

In my copending application Serial No. 589,045 filed January 26, 1932, of which the present application is a continuation in part, I show a method of manufacturing a pigment, either calcium carbonate magnesium hydroxide or calcium carbonate magnesium basic carbonate, by the action of carbon dioxide on slaked lime containing magnesia or on an aqueous mixture comprising calcium hydroxide magnesium hydroxide or on a mix of water and calcium carbonate magnesium hydroxide. I may start with slaked lime containing magnesia or with a material which is the reaction product of slaked lime containing magnesia and sodium carbonate, in which the slaked lime containing magnesia was used in excess, or I may start with calcium carbonate magnesium hydroxide, which may be the reaction product of sodium carbonate and slaked lime containing magnesia when no excess of lime containing magnesia was used. One of the adaptations of the process is the retaining in such original starting materials as have been involved in a causticizing reaction of part of the sodium compound present in such causticizing reaction, in which case the subsequent addition of carbon dioxide with conversion to calcium carbonate magnesium hydroxide, or calcium carbonate magnesium basic carbonate, takes place in the presence of the sodium compound. Or sometimes an alkaline sodium compound is otherwise mixed with the starting material to be carbonated. Thus a certain amount of sodium compound, such as sodium carbonate, may be present during the addition of carbon dioxide to the mix. While there is no limiting figure given as to the amount of sodium compound used, an example of an amount which may be employed is given as 1% more or less. The material produced is used in paper manufacture to make filled or coated paper. The apparatus employed for gas absorption preferably includes some means for intimately mixing the gas with the aqueous suspension of solids, a high speed agitator such as a turbo mixer being very satisfactory.

To summarize: my second copending application referred to immediately above among other things discloses the manufacture of calcium carbonate magnesium hydroxide or calcium carbonate magnesium basic carbonate by a reaction involving the use of carbon dioxide in the presence of sodium compound such as sodium carbonate conveniently in small amount, and the manufacture of filled and coated papers with the so produced material.

Calcium carbonate and calcium carbonate magnesium hydroxide, when produced by means of carbon dioxide in the presence of sodium compound, disclosed in my two copending applications referred to above, have characteristics distinctly different from the characteristics of such pigments when produced by means of sodium carbonate in the absence of carbon dioxide, such as in the causticizing process by reaction of sodium carbonate on slaked lime or slaked lime containing magnesia. Moreover the filled and coated papers produced therewith are different in characteristics and in quality from the papers made with pigment produced in the causticizing process in the absence of carbon dioxide. The presence of carbon dioxide with the sodium carbonate results in a modification of the pigments produced probably due to the fact that sodium hydroxide, if produced, during part of the reaction at least acts as a transitory intermediate product.

Likewise calcium carbonate, calcium carbonate magnesium hydroxide and calcium carbonate magnesium basic carbonate, when produced by means of carbon dioxide in the presence of sodium compound, disclosed in my two copending applications referred to above, have characteristics distinctly different from the characteristics of such pigments when produced with carbon dioxide in the absence of an alkali metal compound such as sodium compound. Moreover the filled and coated papers produced therewith are different in characteristics and in quality from the papers made with pigment produced by the action of carbon dioxide on slaked lime, slaked lime containing magnesia, or calcium carbonate magnesium hydroxide, in the absence of sodium compound.

It will be noted that the alkaline earth metal carbonates made from slaked lime, slaked lime containing magnesia, or calcium carbonate magnesium hydroxide, by carbon dioxide in the presence of sodium compound are not precipitated by the action of the carbon dioxide, but rather that the sorium compound present acts with the lime or the like to produce them. The action of the lime on the sodium compound produces sodium hydroxide probably at least momentarily, or perhaps sodium carbonate if sodium bicarbonate be the starting material. The carbon dioxide which is added then acts to convert its equivalent of sodium hydroxide, or carbonate, which is formed into sodium carbonate, or bicarbonate, which in turn reacts with more of the lime. In other words, the sodium carbonate or bicarbonate originally present is converted in whole or in part to sodium hydroxide or carbonate by reaction with the slaked lime, and is then quickly reconverted by the carbon dioxide, at least to the extent to which the carbon dioxide is added, and this is repeated throughout the reaction until either the lime is exhausted or the carbon dioxide addition is discontinued, or both. The sodium compound in this case acts as a carrier of the carbonate radicle freshly supplied by the carbon dioxide, and the reason why a different result is obtained from that when carbon dioxide is used in the absence of a sodium compound appears to be that the lime is not precipitated by the carbon dioxide directly but rather by the sodium compound. The reaction actually forming the alkaline earth metal carbonate is thus in the nature of an intermediate reaction, which differentiates the process and product as well as the filled and/or coated paper made therewith from the process of the precipitation of calcium carbonate from lime with carbon dioxide, or the paper made therewith.

It has been known for many years that it is more desirable to use pigments such as calcium carbonate in a wet form as produced rather than in a dry form owing to the fact that the particles when dry tend to stick together and become difficult to disperse. This is disclosed, for example, in my prior Patent No. 1,260,448, issued May 26, 1918, dealing withe the use of lime mud in coated paper. I there state that "It is difficult to moisten thoroughly ordinary calcium carbonate with the complete exclusion of air bubbles, and to produce with that material a perfectly smooth homogeneous lump-free mixture so essential for the formation of a proper surface on 'coated' paper. 'Lime mud', on the contrary, is a thoroughly wet mass, which mixes with water with extreme ease to a perfectly homogeneous bubble-free suspension". Likewise in my prior Patent No. 1,595,416, issued August 10, 1926, dealing with calcium carbonate magnesium basic carbonate, I state that it may be used "in a more or less concentrated water suspension" in the manufacture of paper. Likewise in my prior Patent No. 1,934,639, issued November 7, 1933, I state that the drying of alkaline filler—calcium carbonate, calcium carbonate magnesium hydroxide, calcium carbonate magnesium basic carbonate or the like—"in certain cases results in agglomeration of particles on drying which agglomerates do not readily disperse on subsequent wetting".

So in the present instance I prefer to use the pigment as prepared, without intermediate drying, and of course this is the more economical procedure to employ in a mill where the pigment is made on the premises, as it avoids the expense of drying. However the pigment may be used dry if desired, especially if intermediate shipment is required, in which case the results obtained may be not quite so good as when the undried pigment is employed. It is advantageous in certain cases where the pigment is to be used dry, not to dry the pigment to bone dryness, and/or incorporate a material with the pigment which permits of the pigment being thoroughly wetted up.

The preferred method of carrying out my invention is to slake calcium lime or lime containing magnesia, which may if desired be a dolomitic lime, with water to a thick slurry or mud preferably under vigorous agitation, as these conditions apparently give a more uniform and finely divided product. Although I prefer to slake the lime in hot or boiling water, I may if desired slake it in cooler water or even cold water with substantially satisfactory results, particularly in the case of calcium lime, although in the case of lime containing magnesia hot water is usually desirable in order to get thorough slaking. Any convenient type of reaction vessel or chamber in which gas may subsequently be brought in contact with liquid may be used for slaking, such as a tank, suitably a vertical cylindrical tank fitted with an agitator consisting of an arm with spring steel fingers; or a high speed agitator such as a turbo mixer may be used in such tank, the latter being my preferable procedure. Of course the lime may be slaked in one piece of apparatus and then transferred to a second apparatus for contacting with the gas, but this is an unnecessary complication and I prefer to slake the lime in the same apparatus into which the gas is to be led.

To this slaked lime, suitably in the above described tank fitted with a turbo mixer, I then add sufficient water if enough is not already present, to give the final volume desired, which may be a slurry of any concentration capable of satisfactory agitation. I prefer, however, to employ a mix of such a concentration that the calcium oxide content of the lime used is present in an amount approximately 1 to 5% by weight calculated on the total weight of the aqueous mix, and I suitably use 3% concentration. To this suspension I add an alkali metal compound, such as a sodium salt, preferably sodium carbonate, in an amount approximately 1 to 25% calculated as percent by weight of sodium carbonate on the weight of the calcium oxide content of the lime used. The addition is preferably made while the slaked lime suspension is being vigorously agitated and a moment or two is preferably allowed for thorough incorporation. If I employ sodium hydroxide or other sodium compound instead of sodium carbonate, the percent used is calculated as percent by weight of sodium carbonate—equivalent to the sodium oxide ($Na_2O$) content of the sodium compound used—on the weight of the calcium oxide content of said lime. Similarly if other alkali metal salt is used, the percent used is calculated as percent by weight of alkali metal carbonate—equivalent to the alkali metal oxide ($R_2O$, where R is an alkali metal) content of the alkali metal compound selected—on the weight of the calcium oxide content of said lime. Less than 1% of sodium carbonate may be used if desired as an effect may be obtained thereby, but in practice I have obtained excellent results with approximately 2.5 to 4%, and that is a range which may suitably be used.

The carbon dioxide containing gas is then led into the mix, preferably under conditions of very vigorous agitation. The carbonation proceeds and the speed of carbonation appears to be greater in most cases than it is when carbonation is conducted in the absence of a sodium compound. The completion of the reaction may be tested by the substantial elimination of free lime ($Ca(OH)_2$) from the mix. A chemical test may be used for this, but a colorimetric indicator test applied to test samples removed from the mix has been found convenient in indicating the end-point, if it be desired to run the reaction to completion, which is my preferred procedure.

I find that the effect of temperature on the reaction when producing alkaline earth carbonates, such for example as calcium carbonate, substantially parallels the effect observed in the carbonation reaction in the absence of sodium compound, as well as the effect observed in the causticizing reaction in the absence of carbon dioxide, that is, a very much finer product is apparently produced at lower temperatures. Likewise this parallel appears to be true also as to the effect of concentration, the mixes of lower concentrations producing the more finely divided precipitates. In fact the effect of the variables of the present reaction on particle size of the carbonates produced therein are substantially similar to those shown in my copending applications with Arthur M. Brooks as joint inventor, Serial No. 650,162, filed January 4, 1933, and Serial No. 628,616, filed August 12, 1932, to both of which cross reference is hereby made. In the first of these applications it is disclosed that by carbonating lime when introducing carbon dioxide directly into the mix, a temperature of 50° C. or preferably lower is conducive to finer particle size or colloidal condition, as is the dilution of the mix, and a high concentration of carbon dioxide. In the second of these it is disclosed that by causticizing causticizable alkali metal salts such as sodium carbonate with preslaked lime at a temperature of 70° C. or preferably lower, a finer particle size material is obtained, and dilution favors fineness of particle size or colloidal condition.

While I may use atmospheric, subatmospheric, or superatmospheric pressure in my process, I prefer as a matter of convenience to use pressure substantially atmospheric.

The material I produce is either relatively coarse or relatively fine or indeed of a colloidal character in accordance with the temperature at which it is produced, the temperatures of 70° C. or lower, and particularly below 50° C. and indeed more particularly 30° or lower, giving the very fine particle size or colloidal precipitates; and higher temperatures giving the coarser materials. Likewise as stated, the greater the dilution, suitably 1-5% CaO as indicated above, and the greater the concentration of carbon dioxide in the gas used, the finer, or even more colloidal, are the particles. The optimum results are obtained as to fineness of particle size or colloidality when low temperature, dilute suspension and high concentration gas are employed. While, as stated, the gases high in carbon dioxide content such as substantially pure carbon dioxide, or lime kiln gases which may have a carbon dioxide content of 30-40%, are to be preferred when they are available, nevertheless I find ordinary boiler flue gas which may contain approximately 10 to 14% of carbon dioxide is satisfactory in most cases, particularly when suitably purified as described above.

As stated, although the conditions under which they are formed have somewhat similar effect to that which such conditions have on the precipitates produced by the action of carbon dioxide on lime in the absence of sodium compounds, nevertheless the present precipitates have very distinct characteristics. For example they appear to be substantially more opaque especially when high concentration carbon dioxide is used, as well as finer. They also for some reason appear to take a substantially lesser amount of adhesive to retain them on paper surfaces. They also differentiate from precipitates made in the causticizing process in the absence of carbon dioxide in that for similar conditions of formation they appear to be finer and more colloidal, as well as to give better finishes and require less adhesive particularly in the preferred ranges described herein.

In order to make paper with the pigment produced as described herein, the pigment is either mixed in the beater with the fibrous pulp, or added later in the process or it may be addded to the web, employing other ingredients such as alum which may be added in the beater or if desired later in the process as under minimizing conditions or on the web, as well as starch, which likewise may be added at any point desired. Other ingredients such as sizing, for example rosin size or paraffin size may also be added. In other words, I may employ with this pigment either the regular papermaking procedures or the minimizing procedures disclosed in numerous of my already issued patents. The web is of course dried to the customary moisture content, i. e. to substantial dryness, after it contains the pigment. It may be further finished as by calendering or supercalendering as desired. Either sized or unsized paper may be made.

In coating or surfacing the paper, the pigment is mixed with an adhesive in aqueous form, such as casein, starch, glue or the like, and with any other constituents desired such as evener, and applied to a fibrous web or sheet either on the paper machine as according to the newer processes or later on a coating machine. The web is then dried to substantial dryness as is customary in the art, and further finished as by calendering if desired.

The filled paper made with this pigment has substantially improved uniformity, finish, and opacity as well as improved printing qualities compared with filled papers made with the other pigments herein referred to prepared under analogous conditions. Coated or surfaced paper manufactured with this pigment differs substantially from such paper manufactured with the other pigments herein referred to, prepared under analogous conditions, in respect to the lessened amount of adhesive required, especially compared with the pigment produced with carbon dioxide in the absence of sodium compound and in lesser degree compared with the pigment produced in the causticizing reaction in the absence of carbon dioxide. The coated or surfaced paper also has a more compact surface, has better finishing qualities, than the other papers, and when made with pigment produced under the preferred conditions described herein gives a substantially better shine or finish and also possesses superior printing qualities characteristic thereof.

It will be apparent, therefore, that my paper is of markedly improved characteristics, which improved characteristics are very valuable in many types of paper, particularly in book, magazine, catalogue, and other printing paper in which alkaline earth carbonates are now used so extensively as fillers, as well as in newsprint and lower grades of paper such for example as may contain considerable groundwood or mechanical pulp. This has a great practical advantage as well as great commercial advantage. Likewise the economic advantages of coated or surfaced paper containing my pigment will be appreciated when it is realized that the cost of adhesive is by far the larger part of the cost of the coating mix and any reduction in amount required leads to great reduction in the cost of production of coated or surfaced paper.

This is especially true when it is noted that alkaline earth carbonates have become such an important item in the manufacture of coated paper, and in the light of the fact that it has hitherto been extremely difficult if not impossible to get a carbonate of fine particle size which has very low adhesive requirement.

In my description of the preparation of my pigment given above, no mention is made of the removal of the alkali metal compounds such as sodium compound from the pigment produced. In many instances it is desirable to leave in the pigment a small amount of sodium compound, which aids the flocculation of the pigment when used as a filler, particularly if alum is employed therewith, and it may reduce the viscosity of the coating mix and/or help to dissolve adhesive, providing the pigment is employed in such manner as to aid in the preparation of the aqueous adhesive mix.

However in many cases, and this is my preferred procedure, I prefer to remove substantially completely the alkali metal compound content of my pigment before use, and in such case, this is suitably done by dewatering the final reaction mix, such for example as on a rotary or pressure filter and washing thereon if desired. The greater part, if not substantially all of the recovered solution of the alkali metal compound, may be re-utilized in manufacturing subsequent quantities of the pigment, suitably by adding to the original slaked lime slurry for dilution.

Such pigment, substantially free from residual alkali metal compound, is the preferred form in which I use it as filler and/or coating pigment for paper.

It is also the preferred form in which I use it in the manufacture of the other manufactured articles herein referred to such as putties, lacquers, rubber, paints and the like. In these materials, the pigment is preferably used in dry form, suitably broken down into fine form after drying if desired. Or this may be dispensed with in case the pigment is dried in fine form, such as in spray drying.

For manufacture of rubber, the usual rubber ingredients are employed, such as rubber, softeners, vulcanizing agents, accelerators, pigments, antioxidants and the like, the pigment herein acting as a filler or reinforcing agents. The rubber articles produced therefrom have the superior characteristics imparted thereby. Likewise in lacquers, paints, plastics and putties, the pigment is used as a filler or extender with the production of superior quality manufactured articles.

In the manufacture of my pigment, if I desire to manufacture calcium carbonate magnesium basic carbonate, I may, if I desire, start with calcium carbonate magnesium hydroxide instead of lime containing magnesia, but under ordinary circumstances, I prefer to employ the lime containing magnesia as the starting material.

I have given herein explanations of the mechanism of the reaction herein involved. While I believe these explanations to be the correct ones insofar as my present knowledge extends, it is to be understood that the correctness or incorrectness of these explanations does not affect the invention herein claimed, as regardless of the correctness or incorrectness of these explanations, the pigment obtained and the papers and other articles made therewith are as herein stated.

Likewise it is to be understood that my invention is not limited by any theory which may be herein expressed, as regardless of theory, the practical results are as herein disclosed.

When I speak of calcium lime herein, I means high calcium lime, as understood in the trade.

Where I use the expression "alkaline earth base", I mean of course also to include the case where magnesium may be present in conjunction with the oxide, hydroxide or the like of calcium, strontium or barium, for example, such as in lime containing magnesia where magnesium may be present for example as the oxide, or in slaked lime containing magnesia where magnesium may be present as the hydroxide.

Where I use the expression "alkaline earth metal compound" I mean to confine it to such alkaline earth metal compounds as are substantially water insoluble and substantially white in color.

When I use the expression "acid reacting gas" I mean to confine myself to those acid reacting gases, the acidic radicles corresponding to which when combined with alkaline earth metal radicles yield normal compounds substantially white, and substantially water insoluble at least under the conditions of the reaction.

While I have described in detail the preferred embodiment of my invention, it is to be understood that the details of procedure, the proportions and kinds of ingredients, and the arrangement of steps given in the illustrative examples may be varied without departing from the spirit of my invention or the scope of the subjoined claims.

I claim:
1. A paper which comprises essentially fibrous material and a calcium carbonate pigment and which is of relatively increased opacity, as compared with a similar paper in which the pigment comprises conventional calcium carbonate produced by reacting slaked lime with carbon dioxide under substantially the same conditions except in the absence of alkali metal compound, said calcium carbonate pigment having been produced by mixing in the presence of water materials which comprise slaked lime; an alkaline alkali metal compound in an amount approximately 1 to 25% calculated as percent by weight of alkali metal carbonate—equivalent to the alkali metal oxide ($R_2O$, where R is an alkali metal) content of the alkali metal compound selected—on the weight of the calcium oxide content of said lime; and carbon dioxide in an amount sufficient so that substantially all the calcium oxide content of said lime is converted into calcium carbonate.

2. A paper which comprises essentially fibrous material and a calcium carbonate pigment and which is of relatively increased opacity, as compared with a similar paper in which the pigment comprises conventional calcium carbonate produced by reacting slaked lime with carbon dioxide under substantially the same conditions except in the absence of alkali metal compound, said calcium carbonate pigment having been produced by mixing in the presence of water materials which comprise slaked lime; an alkali metal compound selected from the group of alkali metal compounds consisting of alkali metal hydroxide, alkali metal carbonate and alkali metal bicarbonate, in an amount approximately 1 to 25% calculated as percent by weight of alkali metal carbonate—equivalent to the alkali metal oxide ($R_2O$, where R is an alkali metal) content of the alkali metal compound selected—on the weight of the calcium oxide content of said lime; and carbon dioxide in an amount sufficient so that substantially all the calcium oxide content of said lime is converted into calcium carbonate.

3. A paper which comprises essentially fibrous material and a calcium carbonate pigment and which is of relatively increased opacity, as compared with a similar paper in which the pigment comprises conventional calcium carbonate produced by reacting slaked lime with carbon dioxide under substantially the same conditions except in the absence of alkali metal compound, said calcium carbonate pigment having been produced by mixing in the presence of water materials which comprise slaked lime; a sodium compound selected from the group of sodium compounds consisting of sodium hydroxide, sodium carbonate and sodium bicarbonate, in an amount approximately 1 to 25% calculated as percent by weight of sodium carbonate—equivalent to the sodium oxide ($Na_2O$) content of the sodium compound selected—on the weight of the calcium oxide content of said lime; and carbon dioxide in an amount sufficient so that substantially all the calcium oxide content of said lime is converted into calcium carbonate and so that the substantial absence of sodium hydroxide at the completion of the reaction is insured.

4. A paper which comprises essentially fibrous material and a calcium carbonate pigment and which is of relatively increased opacity, as compared with a similar part in which the pigment comprises conventional calcium carbonate produced by reacting slaked lime with carbon dioxide under substantially the same conditions except in the absence of alkali metal compound, said calcium carbonate pigment having been produced by mixing in the presence of water materials which comprise slaked lime; a sodium compound selected from the group of sodium compounds consisting of sodium hydroxide, sodium carbonate and sodium bicarbonate, in an amount approximately 1 to 25% calculated as percent by weight of sodium carbonate—equivalent to the sodium oxide ($Na_2O$) content of the sodium compound selected—on the weight of the calcium oxide content of said lime; and carbon dioxide in an amount sufficient so that substantially all the calcium oxide content of said lime is converted into calcium carbonate; the temperature of the mix being maintained not above 50° C. during at least a substantial part of the mixing.

5. A paper which comprises essentially fibrous material and a calcium carbonate pigment and which is of relatively increased opacity, as compared with a similar paper in which the pigment comprises conventional calcium carbonate produced by reacting slaked lime with carbon dioxide under substantially the same conditions except in the absence of alkali metal compound, said calcium carbonate pigment having been produced by mixing in the presence of water materials which comprise slaked lime; a sodium compound selected from the group of sodium compounds consisting of sodium hydroxide, sodium carbonate and sodium bicarbonate, in an amount approximately 1 to 25% calculated as percent by weight of sodium carbonate—equivalent to the sodium oxide ($Na_2O$) content of the sodium compound selected—on the weight of the calcium oxide content of said lime; and carbon dioxide in an amount sufficient so that substantially all the calcium oxide content of said lime is converted into calcium carbonate; the calcium oxide content of said lime being present in an amount approximately 1 to 5% by weight calculated on the total weight of the aqueous mix, the temperature of the mix being maintained not above 50° C. during at least a substantial part of the mixing.

HAROLD R. RAFTON.

CERTIFICATE OF CORRECTION.

Patent No. 2,189,832. February 13, 1940.

HAROLD R. RAFTON.

It is hereby certified that error appears in the printed specification of the above numbered patent requiring correction as follows: Page 3, first column, line 6, for the word "carbonate" first occurrence, read --bicarbonate--; page 4, first column, line 29, for "sorium" read --sodium--; page 7, second column, line 8, claim 4, for "part" read --paper--; line 41, claim 5, for "hydoxide" read --hydroxide--; and that the said Letters Patent should be read with this correction therein that the same may conform to the record of the case in the Patent Office.

Signed and sealed this 14th day of May, A. D. 1940.

(Seal)

Henry Van Arsdale,
Acting Commissioner of Patents.